(12) United States Patent
Yamaguchi et al.

(10) Patent No.: US 7,669,688 B2
(45) Date of Patent: Mar. 2, 2010

(54) AUTOMOBILE FRONT PORTION STRUCTURE

(75) Inventors: Akira Yamaguchi, Kanagawa (JP); Go Fujimaru, Kanagawa (JP); Masahiko Tabe, Kanagawa (JP); Tsuyoshi Kobayashi, Kanagawa (JP); Gousuke Wakana, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 310 days.

(21) Appl. No.: 10/572,063

(22) PCT Filed: Oct. 26, 2005

(86) PCT No.: PCT/IB2005/053506

§ 371 (c)(1),
(2), (4) Date: Mar. 28, 2007

(87) PCT Pub. No.: WO2006/046211

PCT Pub. Date: May 4, 2006

(65) Prior Publication Data

US 2008/0197672 A1    Aug. 21, 2008

(30) Foreign Application Priority Data

Oct. 27, 2004   (JP) .................. 2004-311877 U
Feb. 18, 2005   (JP) .................. 2005-042921 U
Jul. 4, 2005    (JP) .................. 2005-194815 U

(51) Int. Cl.
*B62D 21/15*   (2006.01)

(52) U.S. Cl. ............. 180/312; 180/232; 280/93.515; 280/779; 280/784; 296/187.03; 296/187.08; 296/187.09

(58) Field of Classification Search ......... 180/311–312, 180/232, 274; 280/93.515, 124.109, 784, 280/779; 296/187.03, 187.08, 187.09
See application file for complete search history.

(56) References Cited

U.S. PATENT DOCUMENTS

| 4,369,559 | A  | * | 1/1983  | Phillips ............... 29/401.1 |
| 5,385,369 | A  |   | 1/1995  | Mukai et al. |
| 5,460,238 | A  | * | 10/1995 | Burke et al. ............ 180/299 |
| 5,887,896 | A  | * | 3/1999  | Kobayashi et al. ........ 280/781 |
| 5,915,494 | A  | * | 6/1999  | Matsumura et al. ........ 180/232 |
| 6,149,197 | A  | * | 11/2000 | Ishii et al. ............ 280/788 |
| 6,361,074 | B1 | * | 3/2002  | Nonaka et al. .......... 280/777 |

(Continued)

FOREIGN PATENT DOCUMENTS

EP    0 714 824 A1    11/1995

(Continued)

OTHER PUBLICATIONS

PCT International Search Report #PCT/IB2005/053506 dated Jan. 24, 2006.

*Primary Examiner*—Paul N Dickson
*Assistant Examiner*—James English
(74) *Attorney, Agent, or Firm*—Young Basile

(57) ABSTRACT

A front structure for a vehicle comprises a power unit mounted at a front end of the vehicle, a steering gear box provided in front of or behind the power unit in the vehicle, and a suspension member supporting the steering gear box, the steering gear box being situated at a bottom surface of the suspension member so as to move beneath the power unit when the front end of the vehicle is deformed due to a frontal collision.

20 Claims, 18 Drawing Sheets

U.S. PATENT DOCUMENTS

| | | | |
|---|---|---|---|
| 6,672,603 B2 * | 1/2004 | Lee | 280/124.109 |
| 2001/0052432 A1 * | 12/2001 | Yoshioka | 180/68.3 |

FOREIGN PATENT DOCUMENTS

| | | |
|---|---|---|
| EP | 0714824 | 5/1996 |
| EP | 1 081 014 A2 | 8/2000 |
| EP | 1081014 | 7/2001 |
| JP | 05-185951 * | 7/1993 |
| JP | 11-105744 * | 4/1999 |
| JP | 11 278286 | 10/1999 |
| JP | 3460311 | 8/2003 |

* cited by examiner

Front side of vehicle body

Front side of vehicle body

Front side of vehicle body ise now made to the following description taken in conjunction
AUTOMOBILE FRONT PORTION STRUCTURE

RELATED APPLICATIONS

The disclosures of Japanese Patent Applications Nos. 2004-311877, filed Oct. 27, 2004; 2005-42921, filed Feb. 18, 2005; and 2005-194815, filed Jul. 4, 2005, including their specifications, drawings and claims, are incorporated herein by reference in their entireties.

FIELD

Described herein is a front structure of a vehicle for absorbing energy during a frontal collision of the vehicle.

BACKGROUND

A means for improving the performance of a vehicle for potential additional comfort of a passenger during a frontal collision is to absorb the energy of the collision by deforming the front portion of the vehicle, such as the front end frame and suspension member. By deforming the front portion during a collision, deformation of the passenger compartment can be limited.

An example of a structure for reducing the amount of deformation at the front portion of the vehicle is a power unit that comprises an engine and a transmission and auxiliary equipment such as a compressor, an alternator and a pump, in addition to a steering gear box and front wheels.

A front structure of a vehicle for absorbing energy during a collision, is shown for example in Laid Open Japanese Patent No. H08-310444 (see FIGS. 1 to 4 thereof, and paragraphs 0009 to 0024, etc.). In this front structure of a vehicle, a steering gear box is located between a power unit and a dashboard, therefore the amount of deformation of the front end of the vehicle is reduced.

The present invention is a front structure for a vehicle that comprises a power unit mounted on a front end of the vehicle, a steering gear box that is provided in front of or behind the power unit in the vehicle, and a suspension member that supports the steering gear box, wherein the steering gear box is provided at a bottom surface of the suspension member so as to move beneath the power unit if the front end of the vehicle is deformed due to a collision.

Therefore, during a collision of the vehicle, the steering gear box moves beneath the power unit, thereby preventing the steering gear box from being located between the power unit and other elements of the vehicle in the direction of deformation at the front portion of the vehicle.

By doing so, the amount of deformation of the front portion of the vehicle by the steering gear box can be optimized, thereby effectively absorbing energy.

The present front structure for a vehicle effectively absorbs energy by preventing the amount of deformation of the front end of the vehicle during a frontal collision from being interfered with by the steering gear box.

BRIEF DESCRIPTION OF THE DRAWINGS

For a more complete understanding of the present front structure for a vehicle, and the advantages thereof, reference is now made to the following description taken in conjunction with the accompanying drawings, in which.

DETAILED DESCRIPTION OF THE ILLUSTRATED EMBODIMENTS

Figure 1:
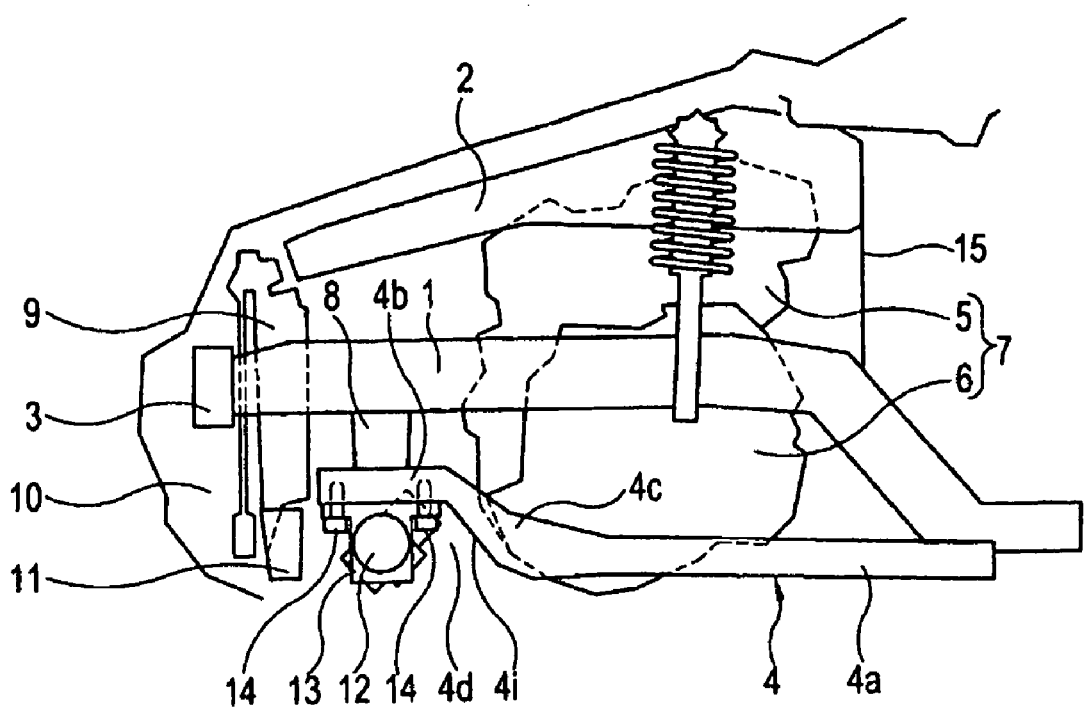
FIG. 1 is a side view of the present front structure of a vehicle body according to a first embodiment.

The following description refers to embodiments of the present front structure for a vehicle. While the claims are not limited to such embodiments, an appreciation of various aspects of the structure is best gained through a discussion of various examples thereof.

The best mode for carrying out the present front structure of a vehicle is explained by referring to the drawings as follows.

Those portions that are identical or equivalent to the above-mentioned prior art are illustrated and described using the same numerals.

Figure 2:
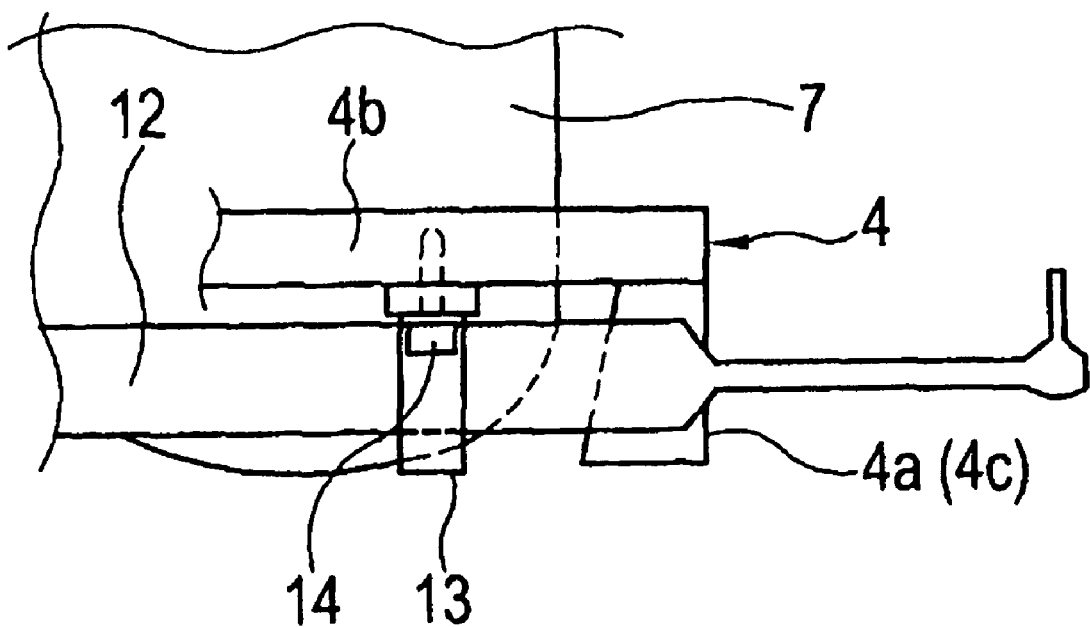
FIG. 2 is a front view of the present front structure of a vehicle according to the first embodiment.

The front structure of the vehicle of according to a first embodiment, as shown in FIGS. 1 and 2, comprises front end frames 1 (only the left side as viewed from the rear is shown in these drawings) provided on both sides of the vehicle and extending toward the front of the vehicle, front end frame uppers 2 provided on both sides of the vehicle in parallel with the front end frames 1, a front cross member 3 connecting the front edges of the front end frames 1 on both sides of the vehicle, and a suspension member 4 extending to the front of the vehicle from the front end frame 1. A power unit 7, in which engine 5 and transmission 6 are integrated, is installed between the front end frames 1 on both sides of the vehicle and on top of the suspension member 4.

The suspension members 4 are provided on both sides of the vehicle and comprise suspension side members 4a that extend towards the front of the vehicle, a suspension cross member 4b connecting the front edges of the suspension side members 4a on both sides of the vehicle, and guides 4c, which are upwardly inclined toward the front of the vehicle and are provided with sloping elements 4i at their respective bottom surfaces, the suspension cross member 4b being mounted on the front ends of the guides 4c.

Under the bottom surfaces of the suspension members 4, a recessed portion 4d, which is surrounded by the guide 4c and the suspension cross member 4b, is formed in the transverse direction of the vehicle, and in this recessed portion 4d, a steering gear box 12 is fixed to the bottom surface of the suspension cross member 4b by a mounting bracket 13 and bolts 14.

The front end frames 1 and suspension cross member 4b are connected to each other by the suspension member support 8. A cooling fan 9, a radiator 10, and a lower cross member 11 are provided in front of the power unit 7, and a dashboard 15 is provided therebehind.

Figure 3:
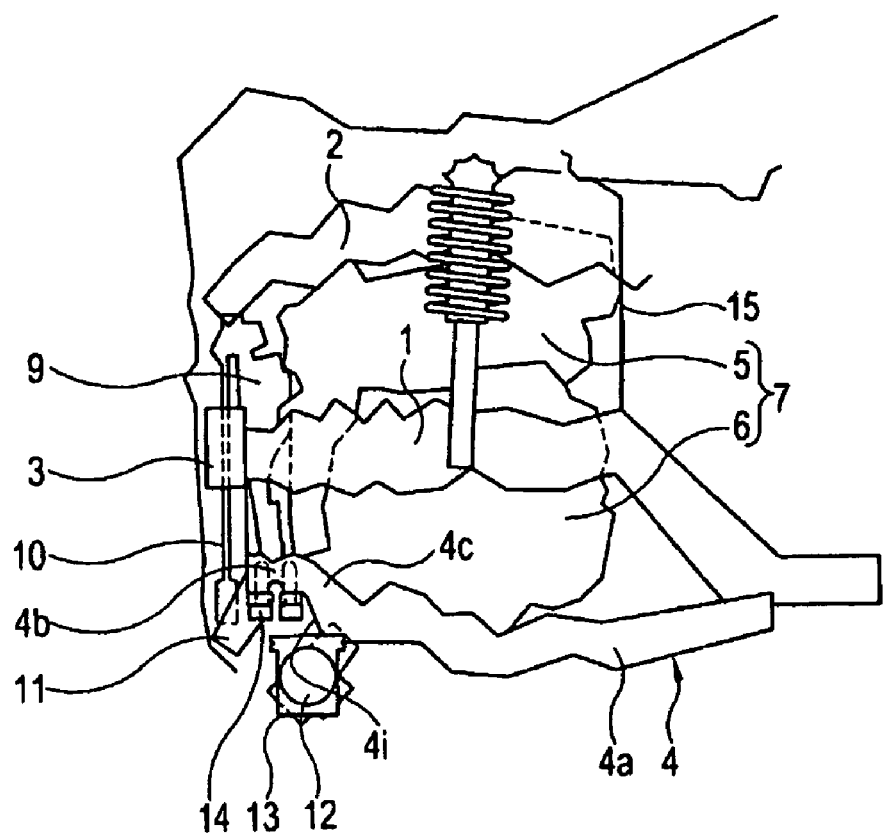
FIG. 3 is a side view illustrating operation of the front structure of the vehicle during an initial stage of collision, according to the first embodiment.

When a load is applied to the steering gear box 12 from the front of the vehicle due to a frontal collision, as shown in FIG. 3, the mounting bracket 13 is fractured, and the steering gear box 12 is separated from the vehicle and moves towards the rear side of the vehicle. At the same time, the steering gear box interacts with the guides 4c (sloping elements 4i) of the suspension members 4 and moves beneath the power unit 7.

As described above, the steering gear box 12 moves to not be located between the power unit 7 and other members of the vehicle, allowing deformation of the space in front of the power unit 7, and consequently an increased amount of deformation in the front of the vehicle can be realized.

In addition, in the first embodiment, the steering gear box 12 is, as shown in FIG. 1, fixed to the recessed portion 4d that is formed in the transverse direction of the vehicle and surrounded by the guides 4c and the suspension cross member 4b.

This allows the ground height of the steering gear box 12 to be increased, thereby reducing damage due to chipping, etc. from the road surface.

With regard to the front structure of the vehicle according to the following described embodiments, elements identical or equivalent to those of the first embodiment are illustrated and described using the same numerals.

Figure 4:
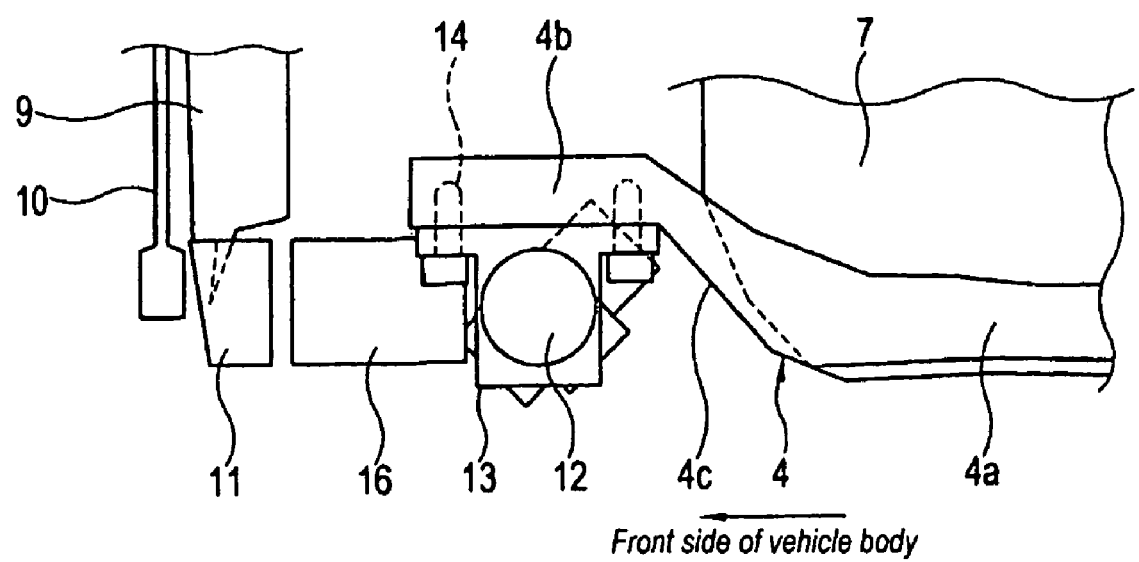
FIG. 4 is a side view of the present front structure of a vehicle body according to a second embodiment.
Figure 5:
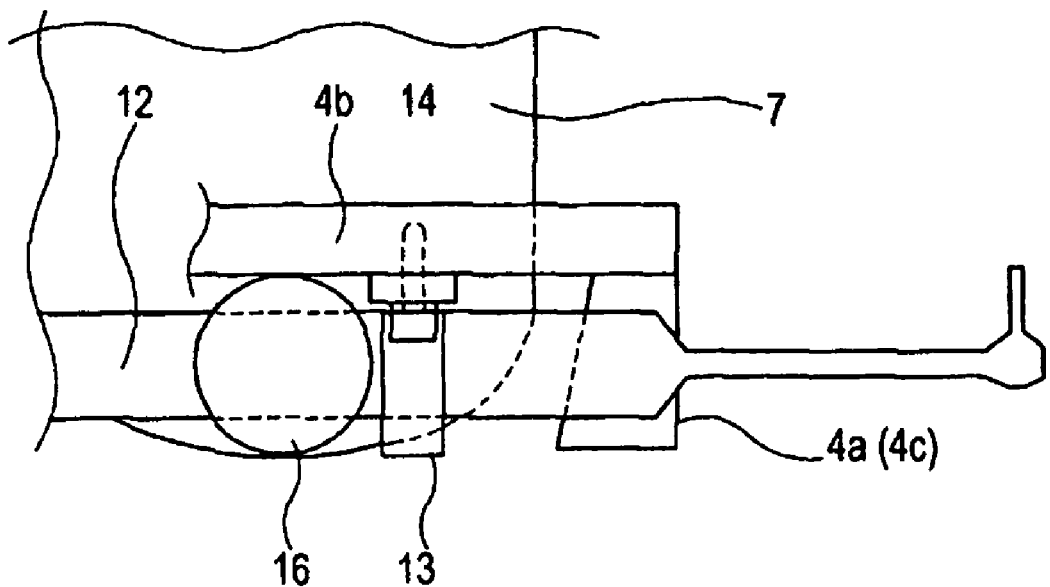
FIG. 5 is a front view of the present front structure of a vehicle according to the second embodiment.

In the front structure of a vehicle according to a second embodiment, as shown in FIGS. 4 and 5, a projected portion 16, which is formed in an integrated manner in front of the steering gear box 12, is provided at the front end of the mounting bracket 13.

The material and shape of the projected portion 16 are not particularly limited as long as the load of the energy is transmitted to the steering gear box 12 at an early stage of a collision and fractures the mounting bracket 13. When the projected portion 16 comprises a device that is integrated with the steering gear box 12, such as a motor actuator or a hydraulic actuator for the power steering, the vehicle space can be effectively used.

Figure 6:
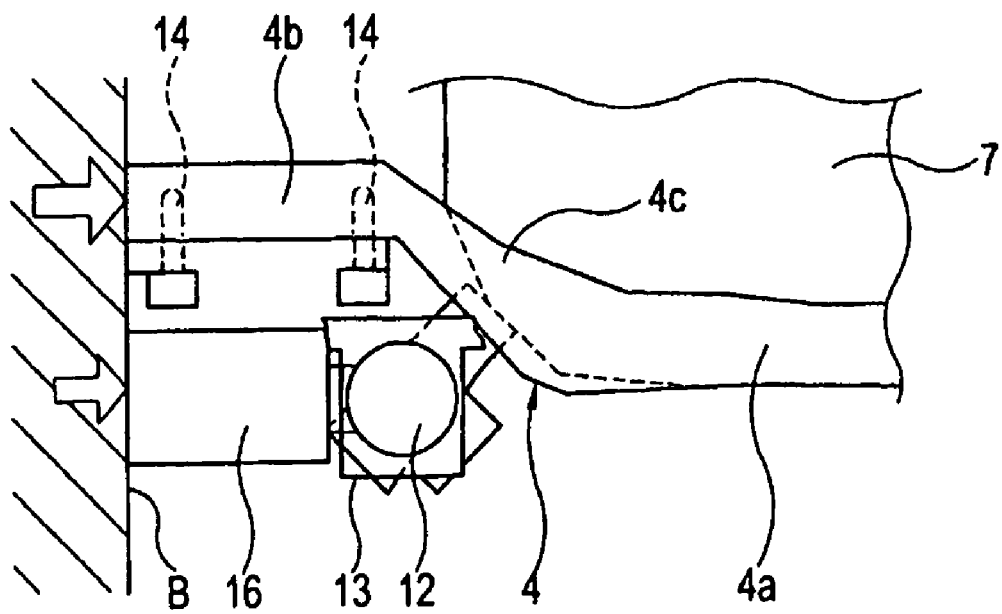
FIG. 6 is a side view illustrating operation of the front structure of the vehicle during an initial stage of collision, according to the second embodiment.

At an early stage of a collision, as shown in FIG. 6, a load from the front end of the vehicle, due to a frontal collision with an object B, is applied to the steering gear box 12 via the projected portion 16, thereby fracturing the mounting bracket 13. Then the steering gear box 12 moves towards the rear side of the vehicle, interacts with the guides 4c of the suspension members 4, and moves downwardly. Consequently, the steering gear box 12 is able to avoid being located between the power unit 7 and the collision object B.

Figure 7:
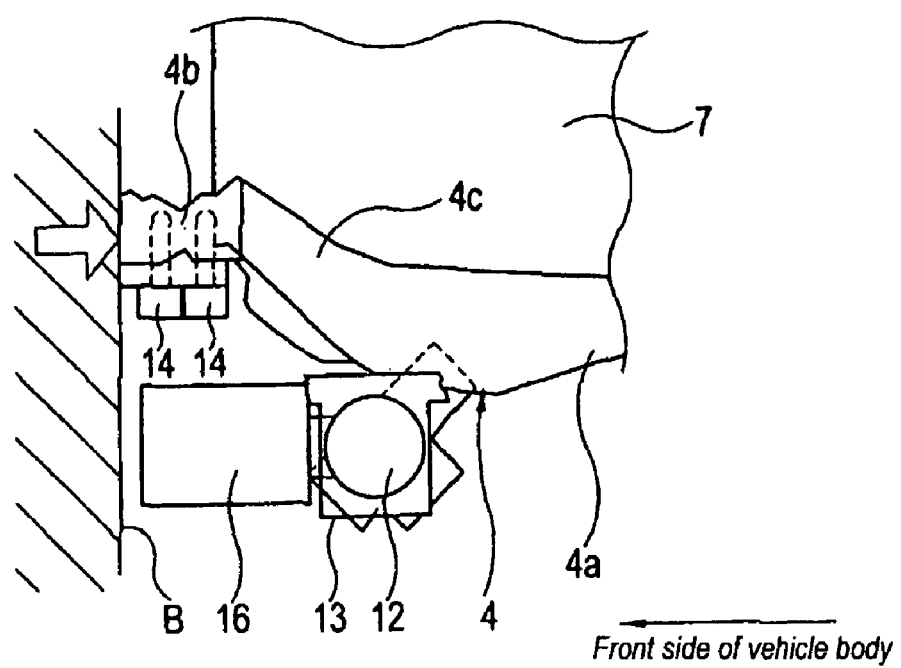
FIG. 7 is a side view illustrating operation of the front structure of the vehicle during an advanced stage of collision, according to the second embodiment.

When the deformation of the front end of the vehicle further advances, as shown in FIG. 7, the steering gear box 12, which is completely separated from the vehicle, moves beneath the power unit 7, without being located between the power unit 7 and the collision object B. In addition, because of the breakage of the mounting bracket 13, the suspension cross member 4b is deformed due to reduction of its strength, so that a large space in front of the power unit 7 can be deformed.

As described above, in the second embodiment, the steering gear box 12 is released from the suspension member 4 at an early stage of the collision, and therefore, it is possible to ensure that the steering gear box 12 moves beneath the power unit 7.

The descriptions of other structures and operations are omitted because they are the same as those in the first embodiment.

Figure 8:
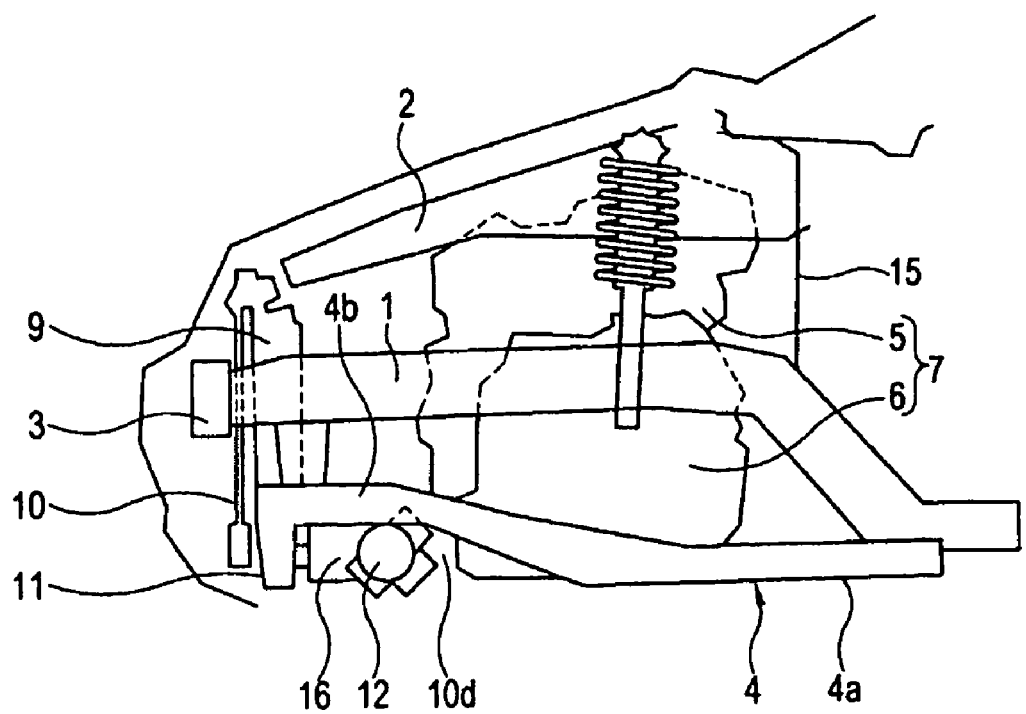
FIG. 8 is a side view of the present front structure of a vehicle body according to a third embodiment.

In the front structure of a vehicle according to a third embodiment, as shown in FIG. 8, the front edges of the suspension side members 4a on both sides of the vehicle are connected with a lower cross member 11 to form a suspension member 4, and the steering gear box 12 and projected portion 16 are provided in a recessed portion 10d provided in a V-shape in the bottom side of the suspension side members 4a.

Figure 9:
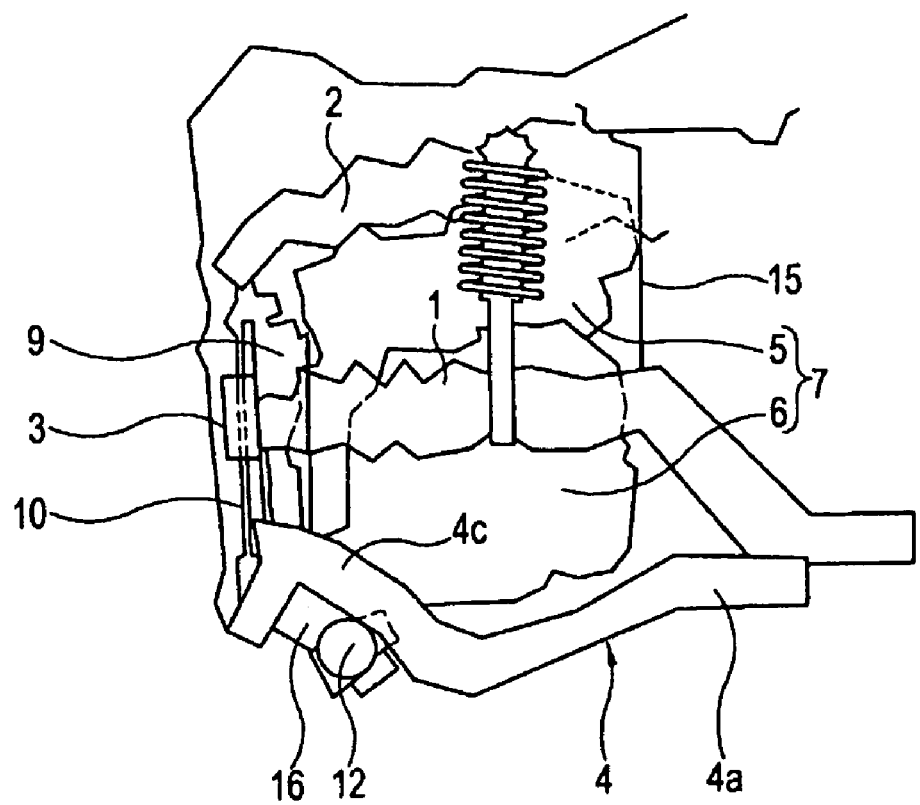
FIG. 9 is a side view illustrating operation of the front structure of the vehicle according to the third embodiment.

The front edge of the suspension member 4 is extended to the front end of the vehicle so that when a load is applied from the front end of the vehicle at the initial stage of a collision, the suspension side members 4a are bent and deformed as shown in FIG. 9, thereby forming guides 4c.

Thus, the steering gear box 12 interacts with the guides 4c of the suspension side members 4a and moves beneath the power unit 7.

The descriptions of other structures and operations are omitted because they are the same as those in the first embodiment.

Figure 10:
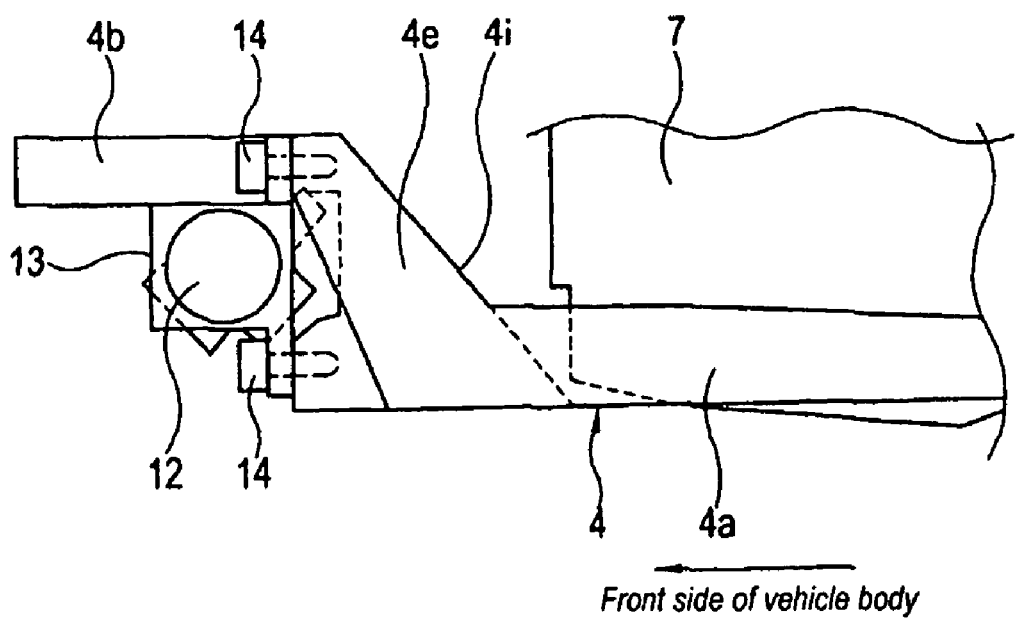
FIG. 10 is a side view of the present front structure of a vehicle body according to a fourth embodiment.

In the front structure of a vehicle according to a fourth embodiment, as shown in FIG. 10, each of guide members 4e having a sloping element 4i on its top surface is formed along the suspension cross member 4b, and at the front edge portion of the guide member 4e the steering gear box 12 is fixed with a mounting bracket 13 and bolts 14, 14.

Figure 11:
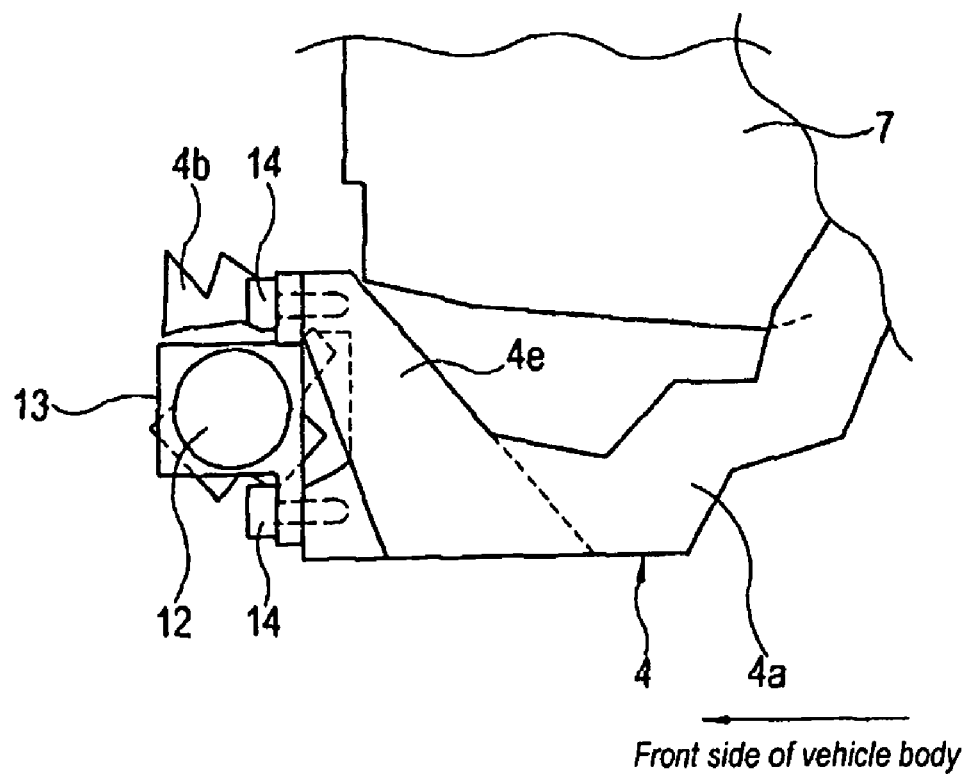
FIG. 11 is a side view illustrating operation of the front structure of the vehicle according to the fourth embodiment.

As shown in FIG. 11, the suspension cross member 4b and the suspension side members 4a are deformed because of a load from the front end of the vehicle due to a frontal collision, and the guide member 4e interacts with the power unit 7. Therefore the steering gear box 12 moves beneath the power unit 7.

The descriptions of other structures and operations are omitted because they are the same as those in the first embodiment.

Figure 12:
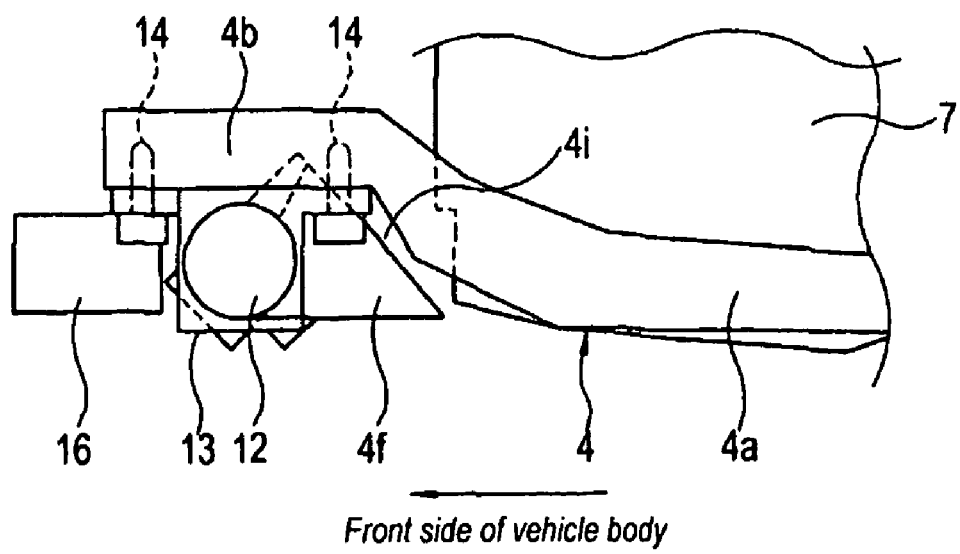
FIG. 12 is a side view of the present front structure of a vehicle body according to a fifth embodiment.

In the front structure of a vehicle according to a fifth embodiment, as shown in FIG. 12, a guide member 4f having a sloping element 4i on its top surface is mounted in the longitudinal direction of the steering gear box 12 towards the rear end of the vehicle. The steering gear box 12 is fixed to the suspension cross member 4b with a mounting bracket 13 and bolts 14, and a projected portion 16 is provided in front of the steering gear box 12.

Figure 13:
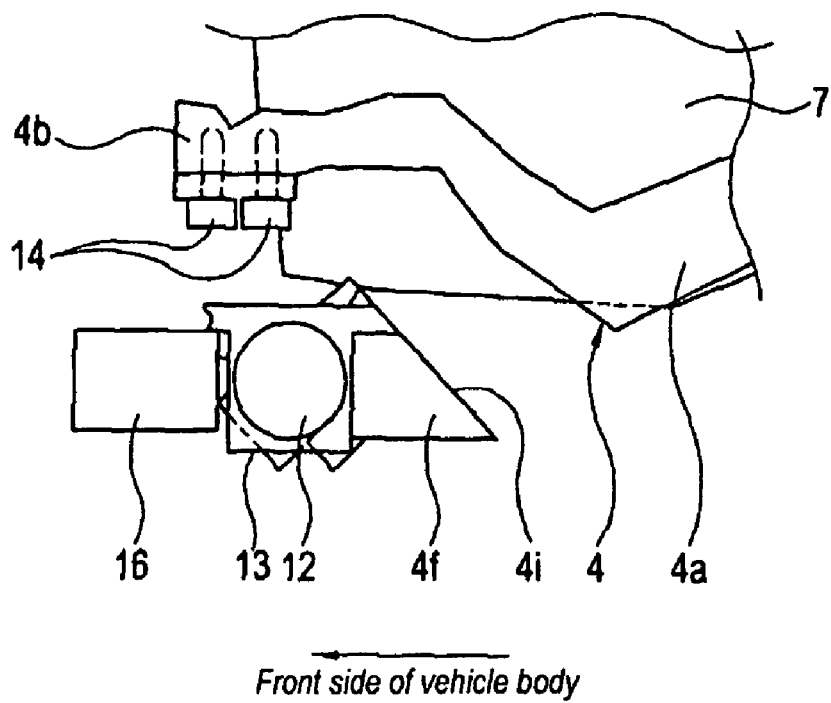
FIG. 13 is a side view illustrating an operation of the front structure of the vehicle according to the fifth embodiment.

As shown in FIG. 13, when a load is applied from the front end of the vehicle via the projected portion 16 to the steering gear box 12 due to a frontal collision, the mounting bracket 13 is fractured, and after the steering gear box 12 moves with the guide 4f in the direction of the rear end of the vehicle, the steering gear box 12 interacts with the power unit 7, thereby moving downwardly.

The descriptions of other structures and operations are omitted because they are the same as those in the first embodiment.

Figure 14:
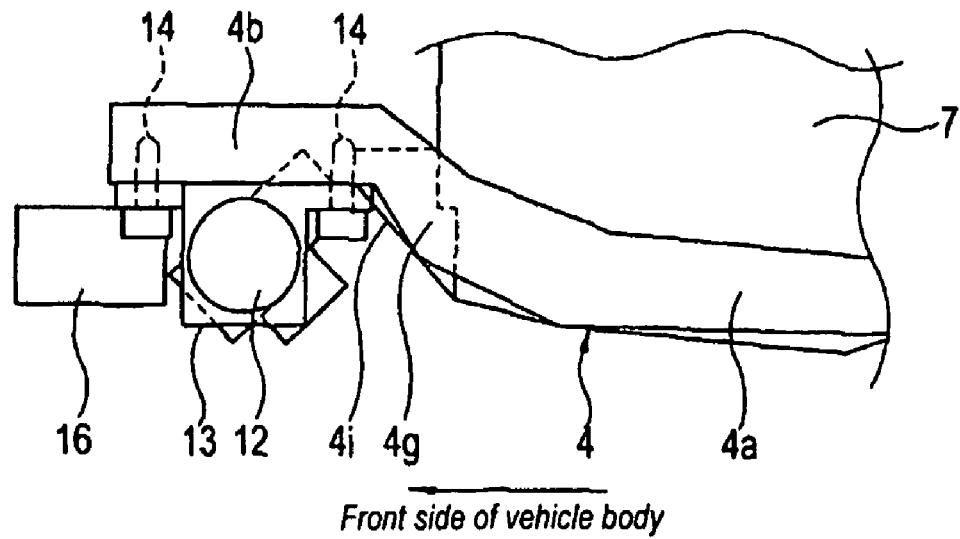
FIG. 14 is a side view of the present front structure of a vehicle body according to a sixth embodiment.

In the front structure of a vehicle according to a sixth embodiment, as shown in FIG. 14, there is provided a guide member 4g having a sloping element 4i that faces diagonally downwardly in front of the power unit 7. A steering gear box 12 is fixed to the suspension cross member 4b with a mounting bracket 13, and a projected portion 16 is provided in front of the steering gear box 12.

Figure 15:
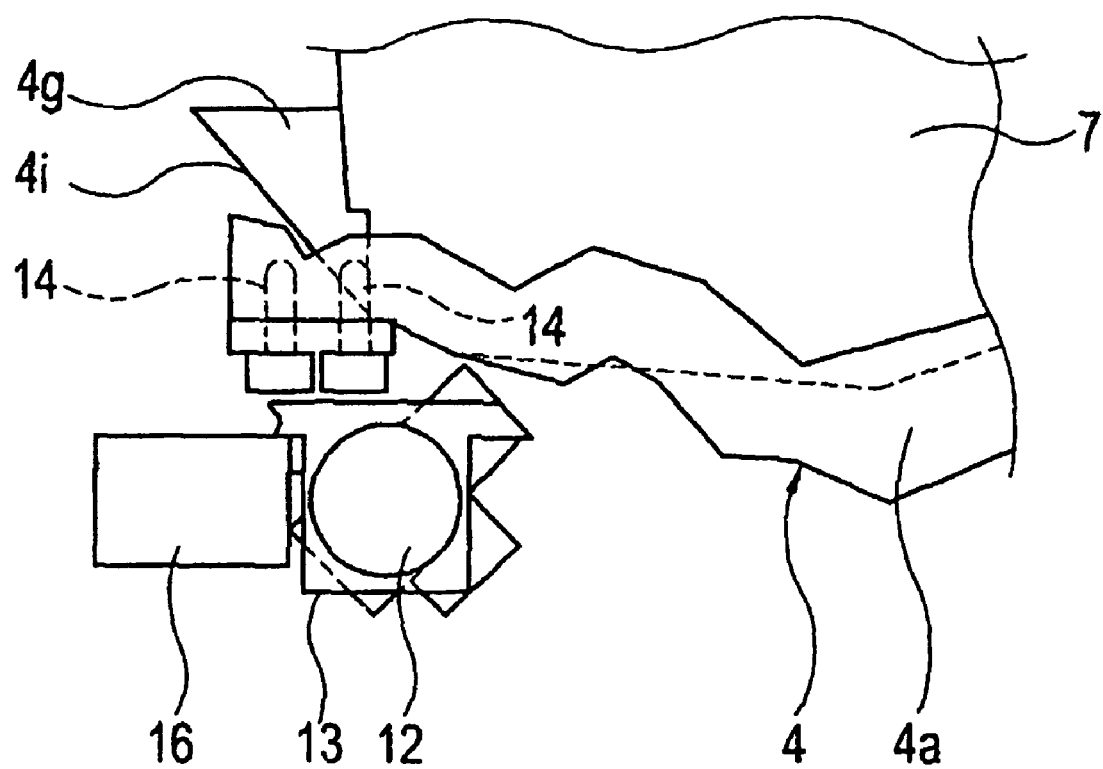
FIG. 15 is a side view illustrating an operation of the front structure of the vehicle according to the sixth embodiment.

As shown in FIG. 15, when a load is applied to the steering gear box 12 from the front end of the vehicle due to a frontal collision, the mounting bracket 13 is fractured and the steering gear box 12 moves to the rear side of the vehicle, thereby interacting with the guide 4g mounted on the power unit 7 and moving downwardly.

The descriptions of other structures and operations are omitted because they are the same as those in the first embodiment.

Figure 16:
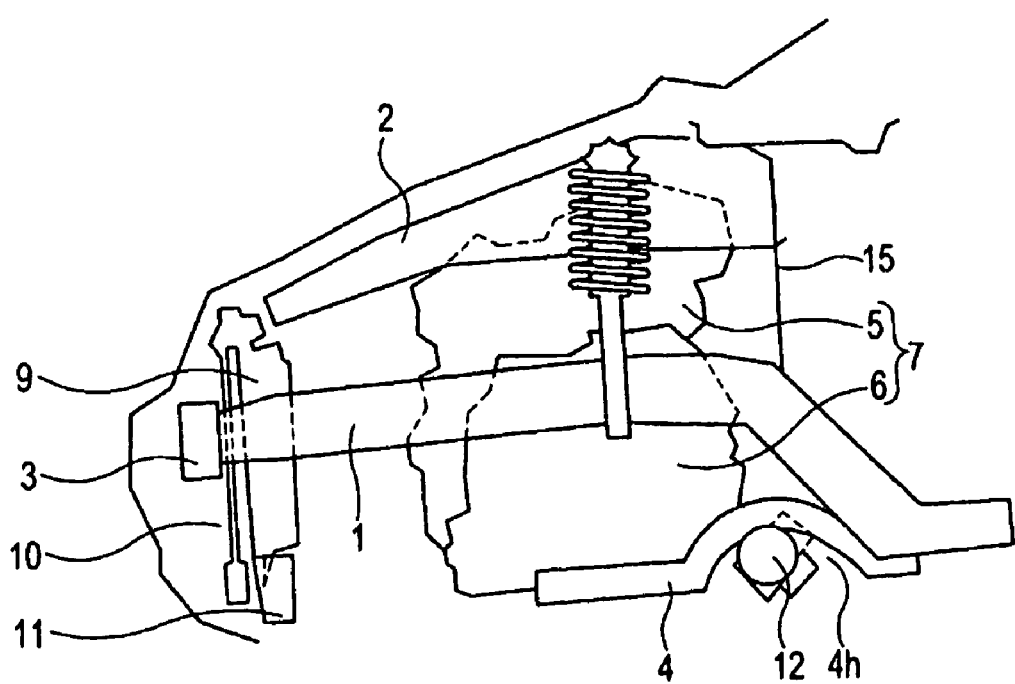
FIG. 16 is a side view of the present front structure of a vehicle body according to a seventh embodiment.

In the front structure of a vehicle according to a seventh embodiment, as shown in FIG. 16, a recessed portion 4h is provided at the bottom of the suspension member 4 behind the power unit 7, and a steering gear box 12 is fixed to the recessed portion 4h.

Figure 17:
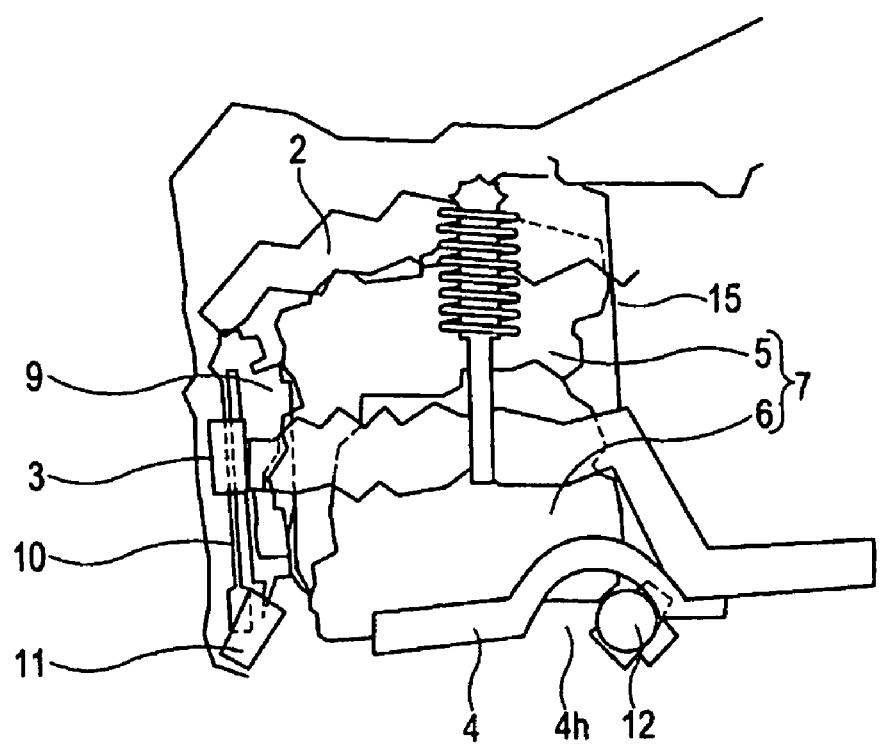
FIG. 17 is a side view illustrating an operation of the front structure of the vehicle according to the seventh embodiment.

As shown in FIG. 17, when the power unit 7 recedes during a frontal collision, the steering gear box 12 is pushed towards the rear end of the vehicle. At this time, the steering box 12 moves downwardly along the recessed portion 4h of the suspension member 4 located on the upper side, thereby preventing the steering gear box 12 from being located between the power unit 7 and a dashboard 15.

The descriptions of other structures and operations are omitted because they are the same as those in the first embodiment.

Figure 18:
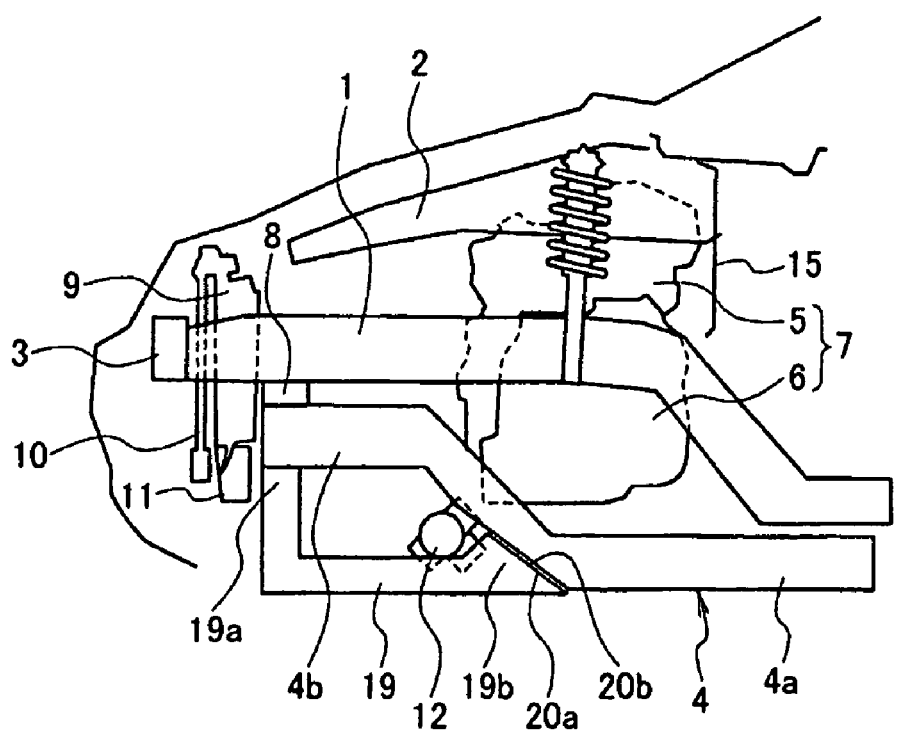
FIG. 18 is a side view of the present front structure of a vehicle body according to an eighth embodiment.

In the front structure of a vehicle according to an eighth embodiment, as shown in FIG. 18, a steering gear box mounting member 19 is fixed to the bottom of each of the suspension members 4, and a space is provided between the bottom surfaces of the suspension members 4 and the top surface of the steering gear box mounting member 19. The steering gear box 12 is provided in this space and is mounted on top of the steering gear box mounting member 19.

The steering gear box mounting member 19 extends in the longitudinal direction along with the suspension side members 4a. The edge 19a located at the front end of the vehicle is fixed to the suspension cross member 4b, and the edge 19b located towards the rear end of the vehicle is fixed to the suspension side member 4a. The fixing force is adjusted so that the steering gear box mounting member 19 can be separated from the suspension member 4 when energy load that exceeds a predetermined value is applied from the front of the vehicle.

A mounting member side sloping element 20a is formed on the edge 19b of the rear side of the vehicle the steering gear box mounting member 19 towards the rear end of the vehicle. A suspension side sloping element 20b that engages with the sloping element 20a is formed on the suspension member 4 facing the front end of the vehicle. The engagement of the mounting member side sloping element 20a and the suspension side sloping element 20b allows stable separation of the steering gear box mounting member 19 from the suspension member 4 when a shock load that exceeds the predetermined value is applied from the front end of the vehicle.

The steering gear box 12 is provided near the edge 19b of the rear side of the vehicle on the steering gear box mounting member 19.

The steering gear box 12 is provided near the edge 19b of the rear side of the vehicle on the steering gear box mounting member 19 and therefore there is a space or distance between the edge 19a, where the steering gear box mounting member 19 is fixed to the suspension cross member 4b, and the steering gear box 12.

Figure 19:
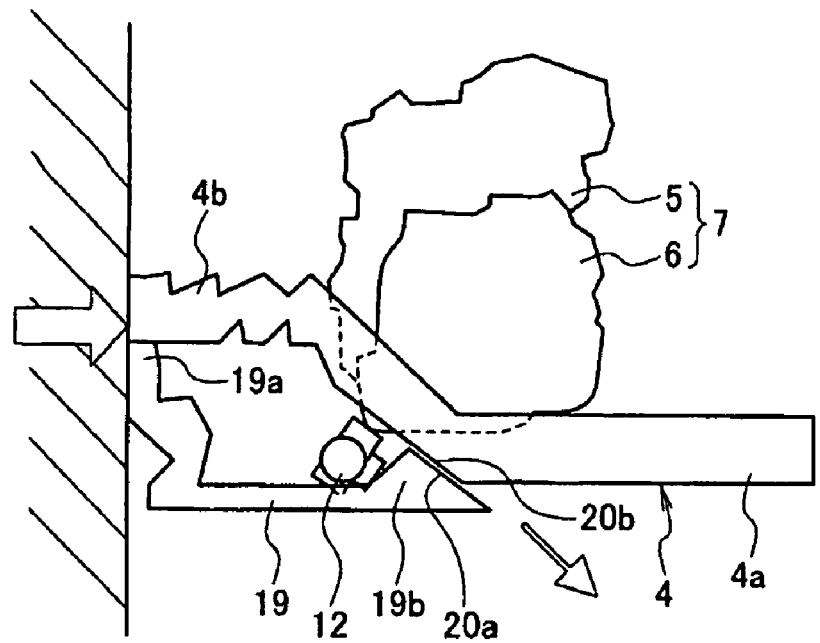
FIG. 19 is a side view illustrating operation of the eighth embodiment in a middle stage of deformation.

Because of this, when energy load that exceeds the predetermined value is applied from the front end of the vehicle, as shown in FIG. 19, before the vehicle parts located in front of the steering gear box 12 come into contact with the steering gear box 12, engagement of the mounting member side sloping element 20a and the suspension side sloping element 20b occurs, and the steering gear box 12 moves towards the rear end of the vehicle along with the steering gear box mounting member 19.

Figure 20:
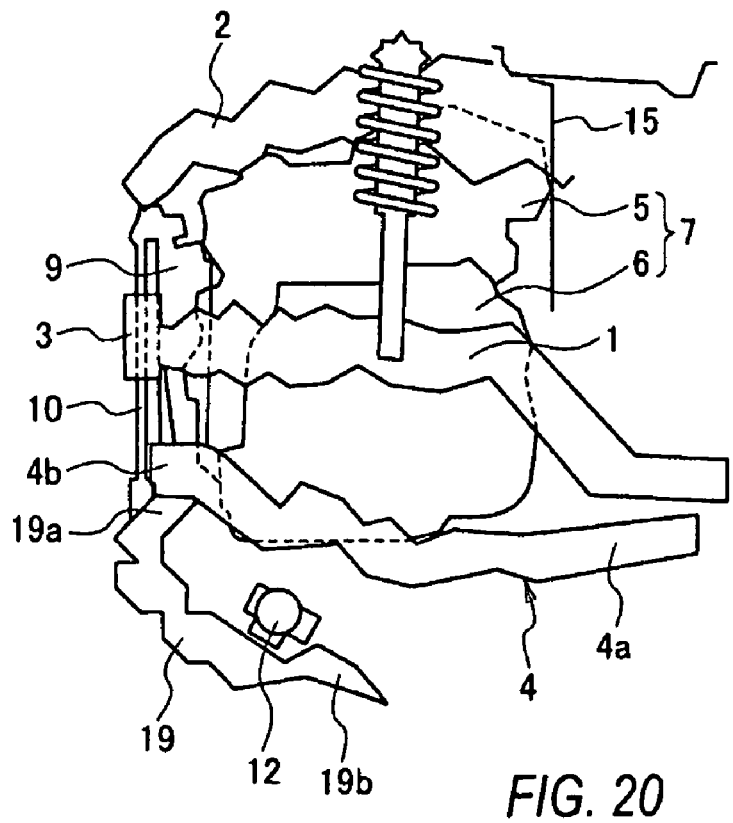
FIG. 20 is a side view illustrating the eighth embodiment of the present front structure when deformation is completed.

When the deformation of the front end of the vehicle further advances, as shown in FIG. 20, the steering gear box mounting member 19 is completely separated from the suspension member 4, so that the steering gear box 12 moves without being located between the power unit 7 and other elements of the vehicle, thereby crushing the space in front of the power unit 7. Consequently, a large crushed part of the front portion of the vehicle can be realized.

The descriptions of other structures and operations are omitted because they are the same as those in the first embodiment.

Figure 21:
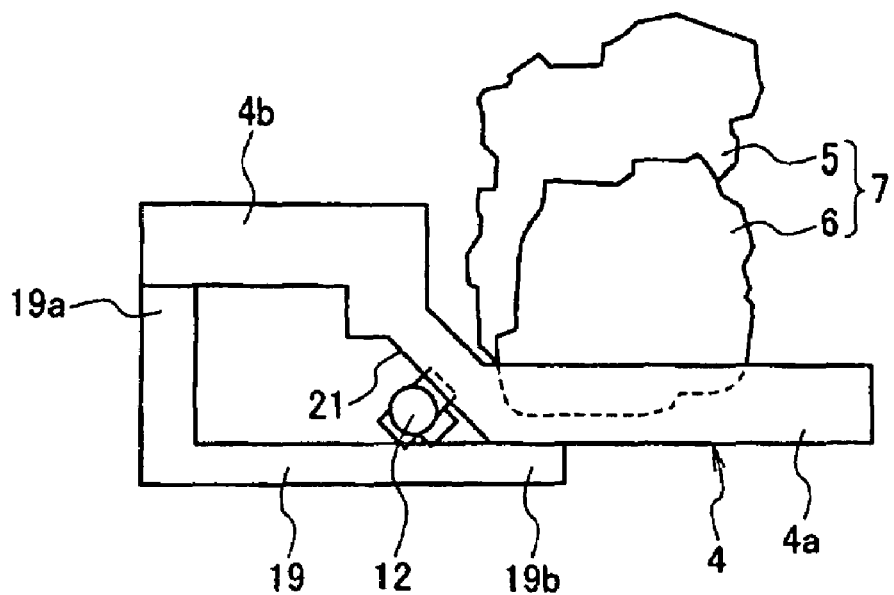
FIG. 21 is a side view of the present front structure of a vehicle body according to a ninth embodiment.

In the front structure of a vehicle according to a ninth embodiment, as shown in FIG. 21, the steering gear box 12 is provided on a steering gear box mounting member 19 fixed to the bottom of the suspension member 4, and a guide 21 that faces the front end of the vehicle is provided on the suspension side members 4a for moving the steering gear box 12 beneath the power unit 7.

The steering gear box 12 is provided near the edge 19b towards the rear end of the vehicle.

Figure 22:
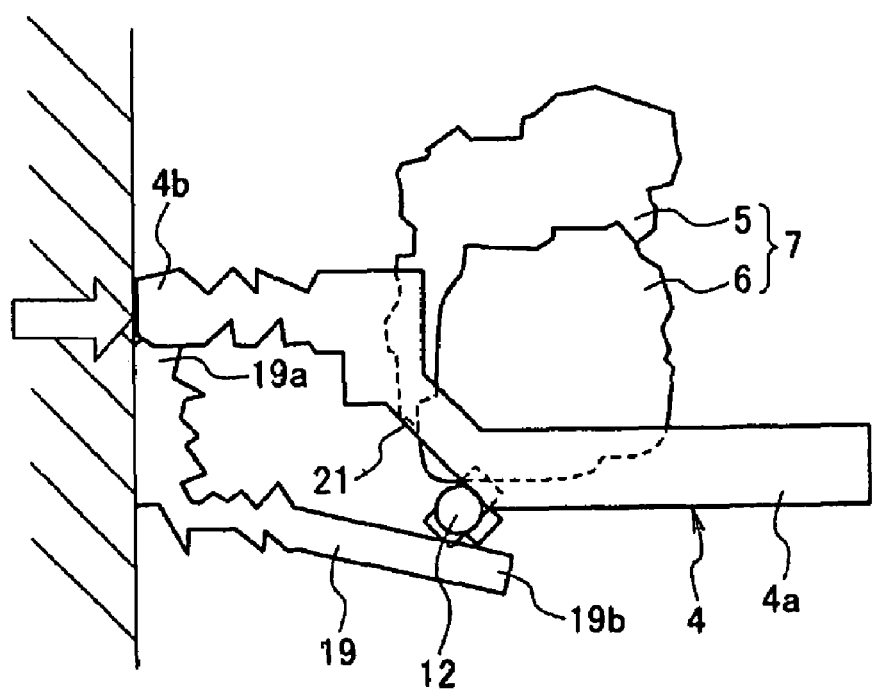
FIG. 22 is a side view illustrating operation of the ninth embodiment in a middle stage of deformation.

The guide 21 for moving the steering gear box 12 beneath the power unit 7 faces towards the front end of the vehicle, and when an energy load that exceeds a predetermined value is applied from the front end of the vehicle, as shown in FIG. 22, the edge 19b at the rear side of the steering gear box mounting member 19 is separated from the suspension member 4, and the steering gear box 12 moves toward the rear end of the vehicle along with the guide 21 and the steering gear box mounting member 19.

Figure 23:
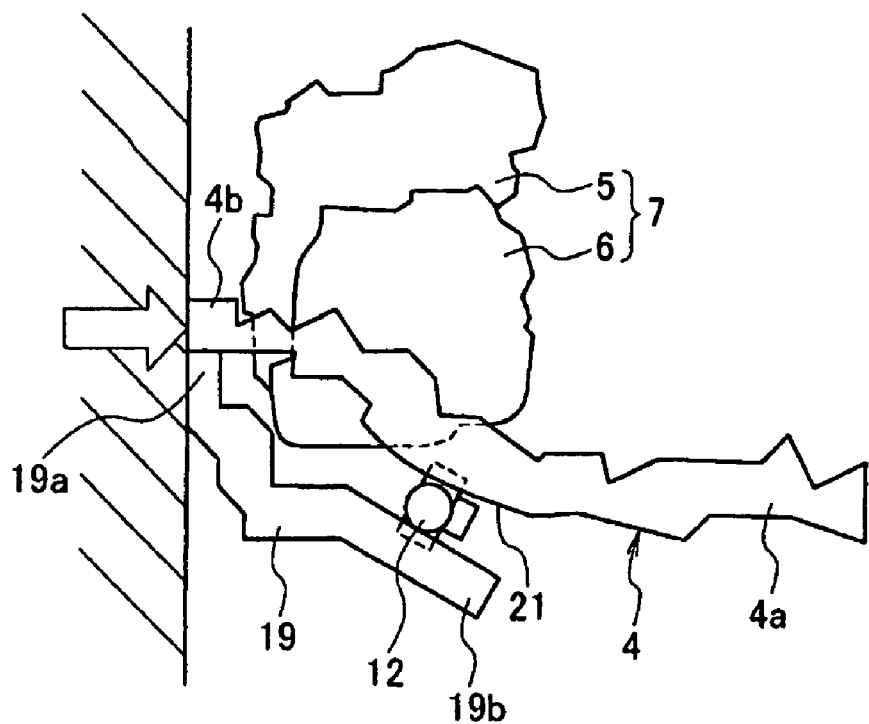
FIG. 23 is a side view illustrating the ninth embodiment of the present front structure when deformation is completed.

When the deformation of the front end of the vehicle further advances, as shown in FIG. 23, the steering gear box mounting member 19 is completely separated from the suspension member 4, so that the steering gear box 12 moves without being sandwiched between the power unit 7 and other elements of the vehicle, thereby deforming the space in front of the power unit 7. Consequently, an increased amount of deformation at the front portion of the vehicle can be realized.

The descriptions of other structures and operations are omitted because they are the same as those in the eighth embodiment.

Figure 24:
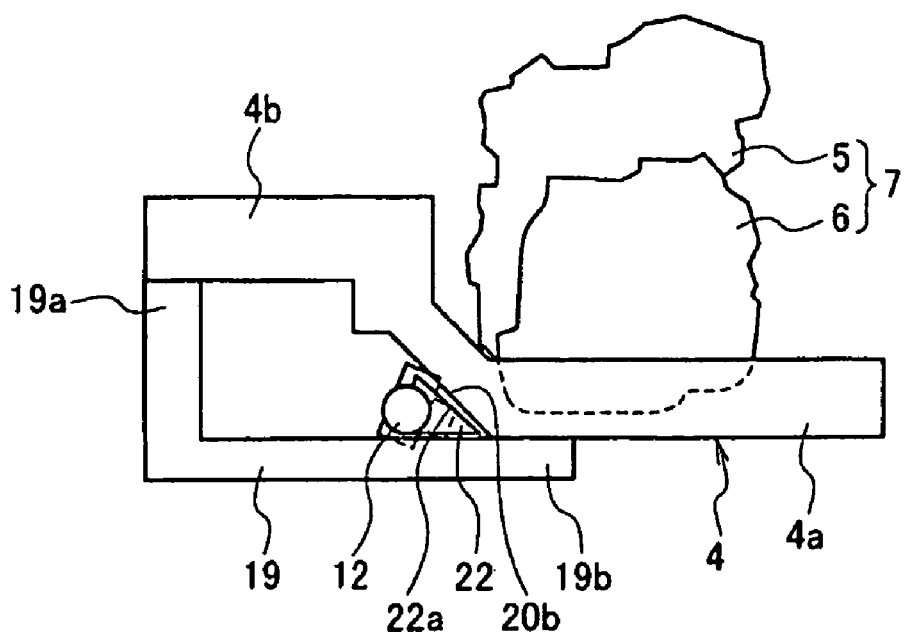
FIG. 24 is a side view of the present front structure of a vehicle body according to a tenth embodiment.

In the front structure of a vehicle according to a tenth embodiment, as shown in FIG. 24, the steering gear box 12 is provided on a steering gear box mounting member 19 fixed at the bottom of the suspension member 4, and a guide member 22 is provided on the side of the steering gear box 12 for moving the steering gear box 12 beneath the power unit 7.

A guide member side sloping element 22a is formed on the guide member 22 towards the rear end of the vehicle, and a suspension side sloping element 20b, engaged with the guide member side sloping element 22a, is formed on the suspension member 4 and facing the front end of the vehicle. The steering gear box 12 is stably separable from the suspension member 4 by the engagement of the guide member side sloping element 22a and the suspension side sloping element 20b.

Figure 25:
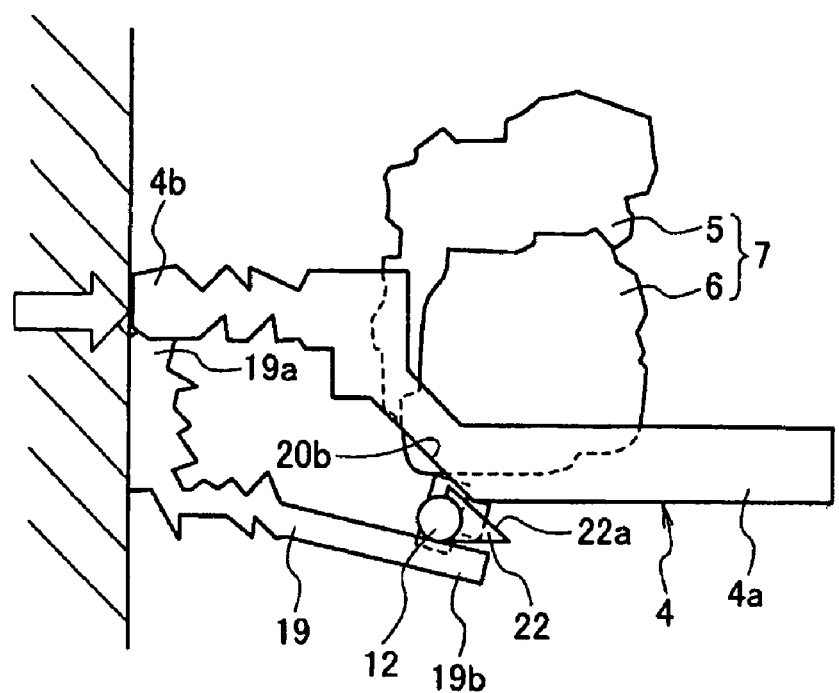
FIG. 25 is a side view illustrating operation of the tenth embodiment in a middle stage of deformation.

When an energy load that exceeds a predetermined value is applied from the front of the vehicle, as shown in FIG. 25, engagement of the guide member side sloping element 22a and the suspension side sloping element 20b occurs, and the steering gear box 12 moves downwardly towards the rear of the vehicle along with the steering gear box mounting member 19. At the same time, the edge 19b of the rear side of the steering gear box mounting member 19 is separated from the suspension member 4.

Figure 26:
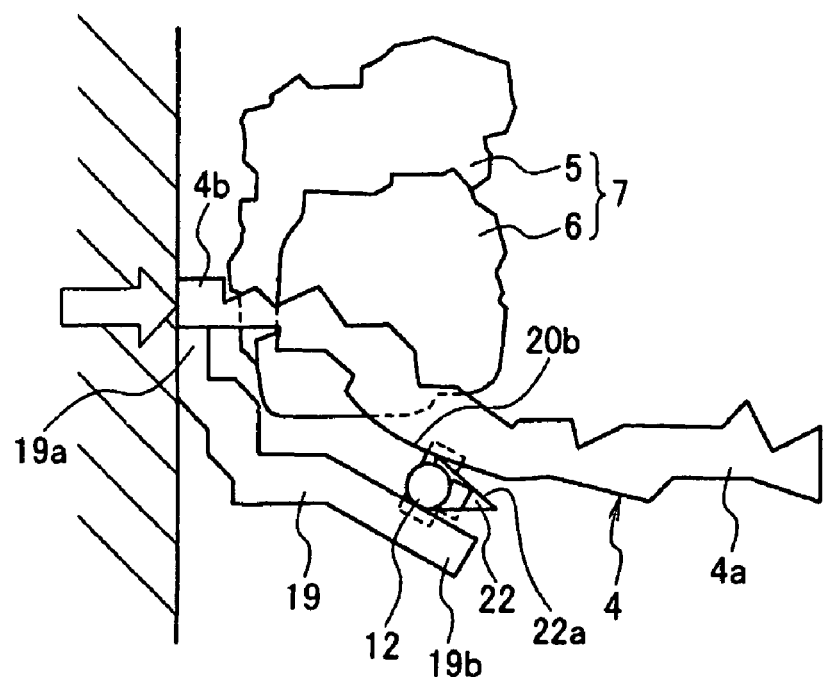
FIG. 26 is a side view illustrating the tenth embodiment of the present front structure when deformation is completed.

When the deformation of the front end of the vehicle further advances, as shown in FIG. 26, the steering gear box mounting member 19 is completely separated from the suspension member 4, so that the steering gear box 12 moves without being located between the power unit 7 and other elements of the vehicle, thereby causing the space in front of the power unit 7 to be deformed. Consequently, a large amount of deformation at the front portion of the vehicle can be realized.

The descriptions of other structures and operations are omitted because they are the same as those in the eighth embodiment.

Figure 27:
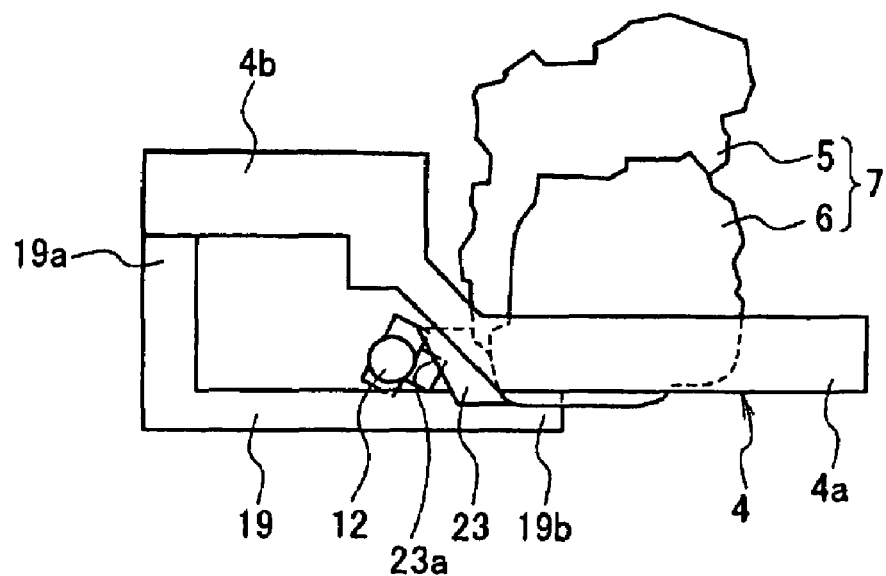
FIG. 27 is a side view of the present front structure of a vehicle body according to an eleventh embodiment.

In the front structure of a vehicle according to an eleventh embodiment, as shown in FIG. 27, the steering gear box 12 is provided on a steering gear box mounting member 19 that is fixed at the bottom of the suspension member 4, and a guide member 23 for moving the steering gear box 12 beneath the power unit 7 is provided in front of the power unit 7.

A sloping element 23a is formed on the guide member 23 towards the front end of the vehicle, so that the steering gear box 12 can move beneath the power unit 7 along the sloping element 23a.

Figure 28:
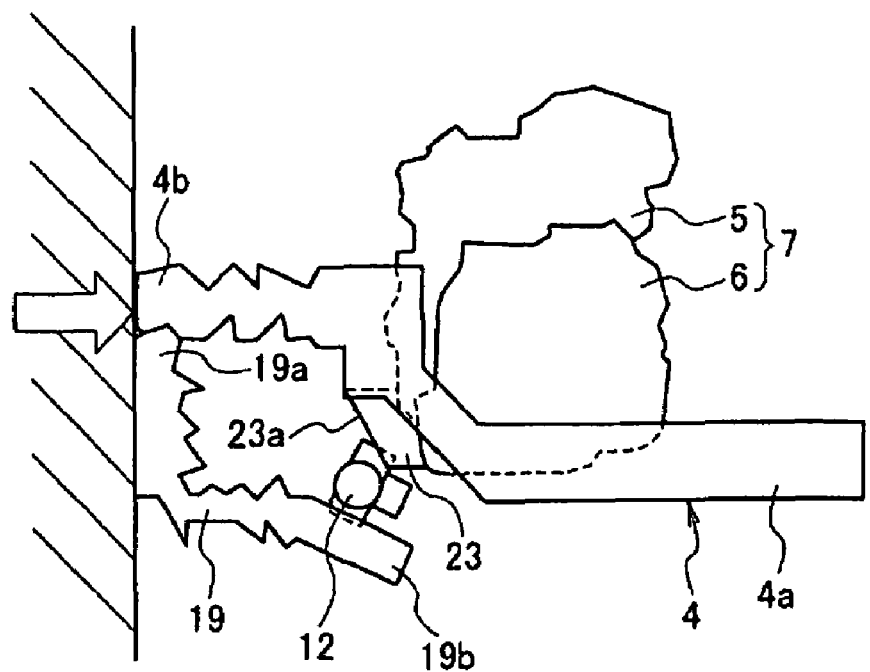
FIG. 28 is a side view illustrating operation of the eleventh embodiment in a middle stage of deformation.

When an energy load that exceeds a predetermined value is applied from the front of the vehicle, as shown in FIG. 28, the steering gear box 12 moves downwardly towards the back of the vehicle along the sloping element 23a of the guide member 23, and at the same time, the edge 19b of the rear side of the steering gear box mounting member 19 is separated from the suspension member 4.

Figure 29:
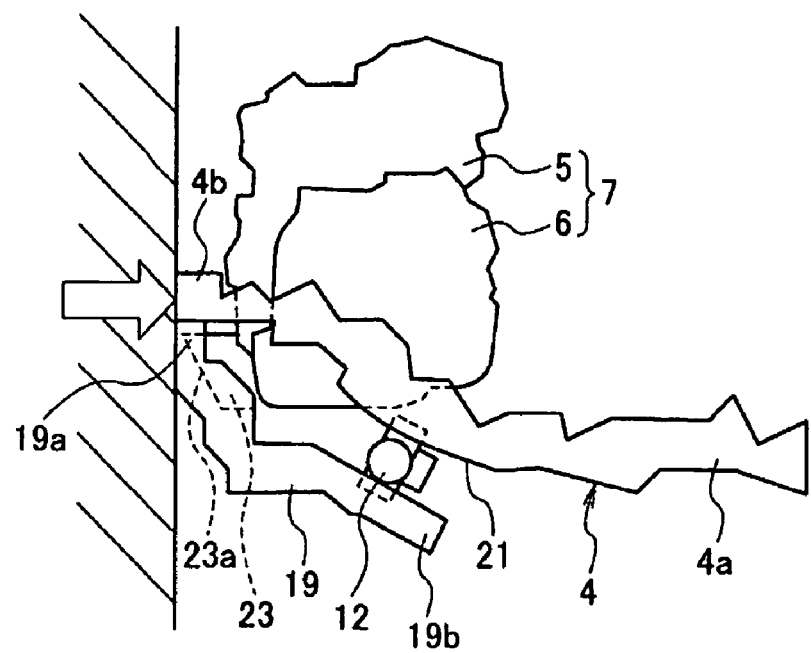
FIG. 29 is a side view illustrating the eleventh embodiment of the present front structure when deformation is completed.

When the deformation of the front end of the vehicle further advances, as shown in FIG. 29, the steering gear box mounting member 19 is completely separated from the suspension member 4, so that the steering gear box 12 moves without being located between the power unit 7 and other elements of the vehicle, thereby allowing the space in front of the power unit 7 to be deformed. Consequently, a large amount of crushing at the front portion of the vehicle can be realized.

The descriptions of other structures and operations are omitted because they are the same as those in the eighth embodiment.

Figure 30:
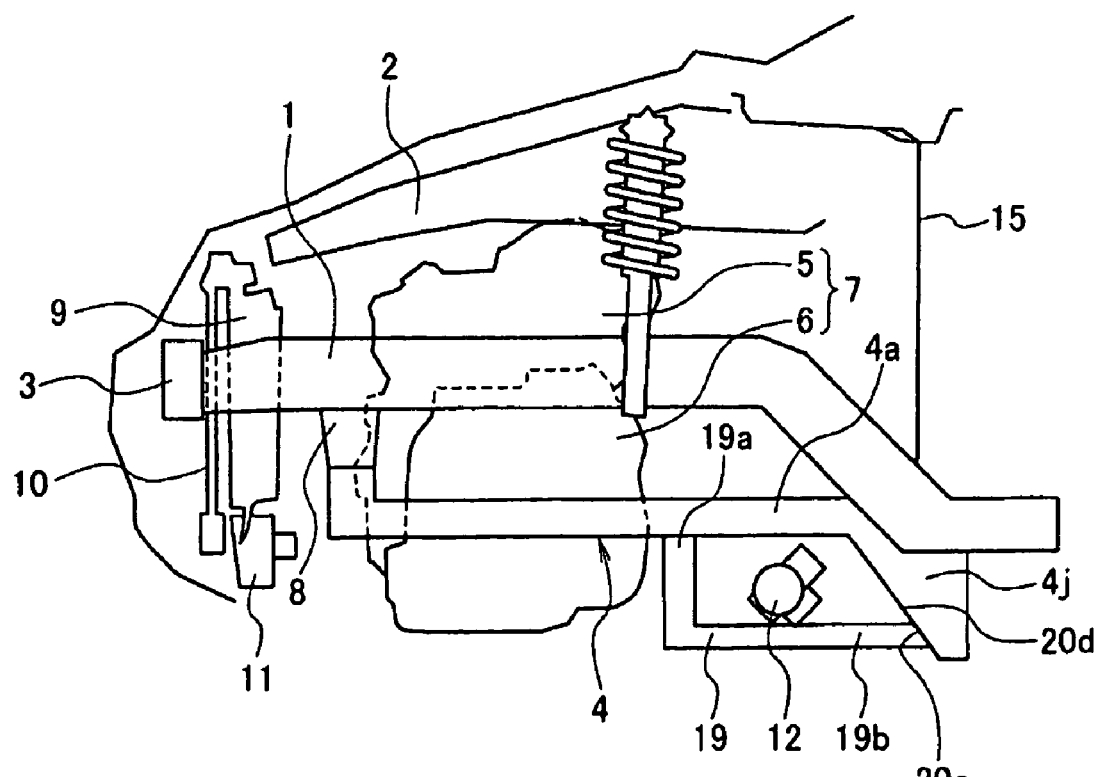
FIG. 30 is a side view of the present front structure of a vehicle body according to a twelfth embodiment.

In the front structure of a vehicle according to a twelfth embodiment, as shown in FIG. 30, a steering gear box mounting member 19 is fixed to the bottom of the suspension member 4 behind the power unit 7, and the steering gear box 12 is provided on the steering gear box mounting member 19.

The steering gear box mounting member 19 extends in the longitudinal direction of the vehicle along the suspension side member 4a, and its edge 19a at the front end of the vehicle is fixed to the suspension member 4, while its edge 19b towards the rear end of the vehicle is fixed to the edge 4j on the rear side of the suspension side member 4a.

A sloping element 20c is formed on the edge 19b of the side of the steering gear box mounting member 19 facing the rear end of the vehicle, and a sloping element 20d that engages with the sloping element 20c is formed on the edge 4j of the rear side of the suspension member 4a and facing the front end of the vehicle.

The steering gear box mounting member 19 is stably separable from the suspension member 4 by engagement of the sloping element 20c and the sloping element 20d when an energy load that exceeds a predetermined value is applied from the front of the vehicle.

Figure 31:
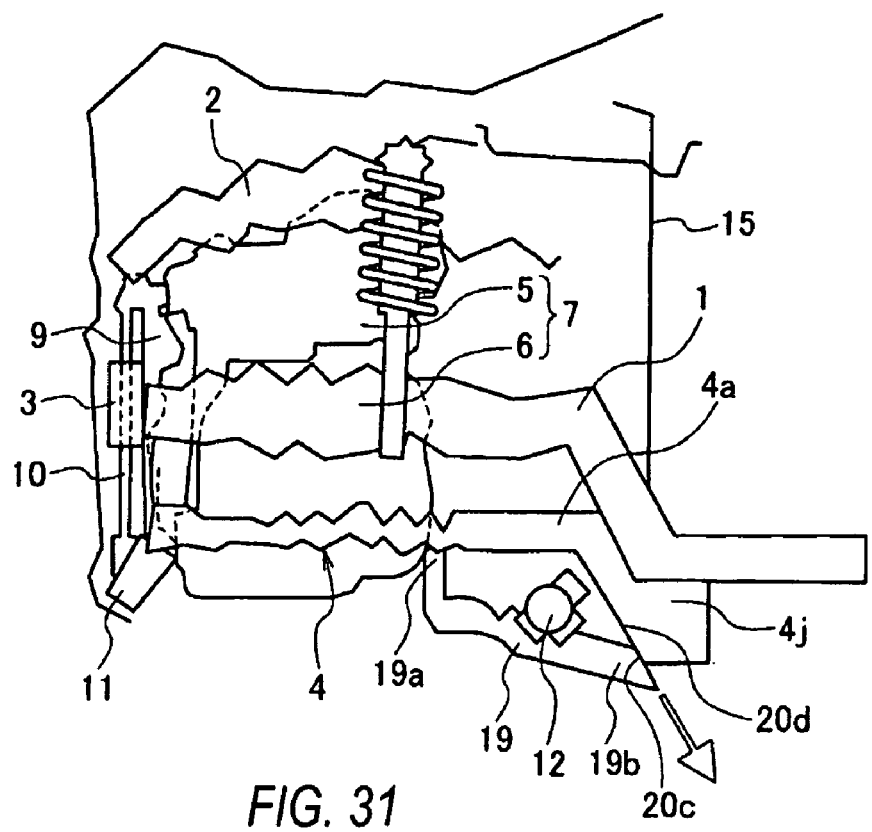
FIG. 31 is a side view illustrating operation of the twelfth embodiment in a middle stage of deformation.

When an energy load that exceeds the predetermined value is applied from the front of the vehicle, as shown in FIG. 31, the engagement between the sloping element 20c of the steering gear box mounting member 19 and the sloping element 20d of the suspension side member 4a occurs, and the steering gear box 12 moves downwardly towards the rear side of the vehicle along with the steering gear box mounting member 19. At the same time, the edge 19b on the rear side of the steering gear box mounting member 19 is separated from the suspension side member 4a.

Figure 32:
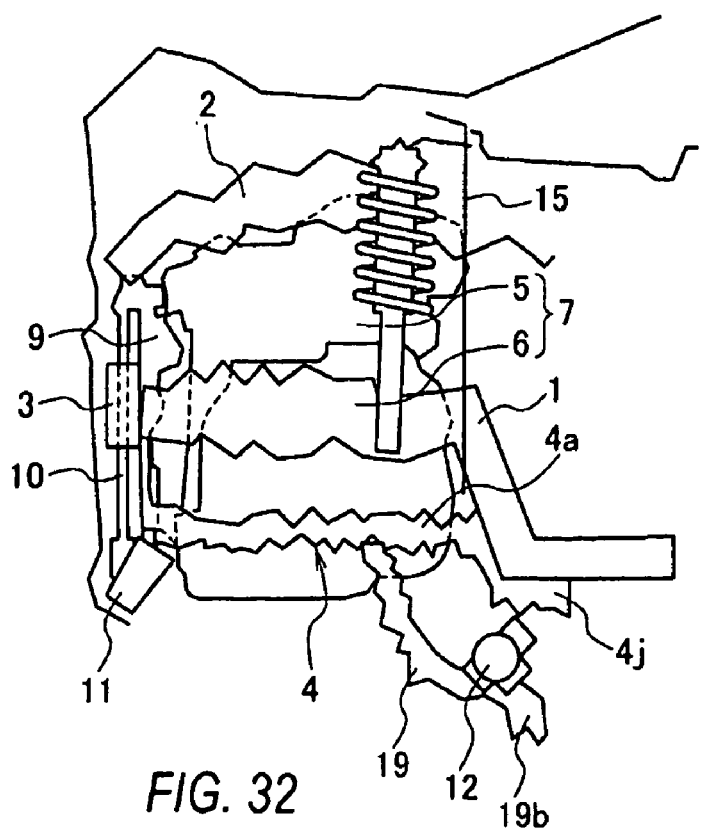
FIG. 32 is a side view illustrating the twelfth embodiment of the present front structure when deformation is completed.

When the deformation of the front end of the vehicle further advances, as shown in FIG. 32, the steering gear box mounting member 19 is completely separated from the suspension member 4a, so that the steering gear box 12 moves without being located between the power unit 7 and other elements of the vehicle, thereby allowing the space in front of the power unit 7 to be deformed. Consequently, a large amount of deformation at the front portion of the vehicle can be realized.

The descriptions of other structures and operations are omitted because they are the same as those in the eighth embodiment.

Figure 33:
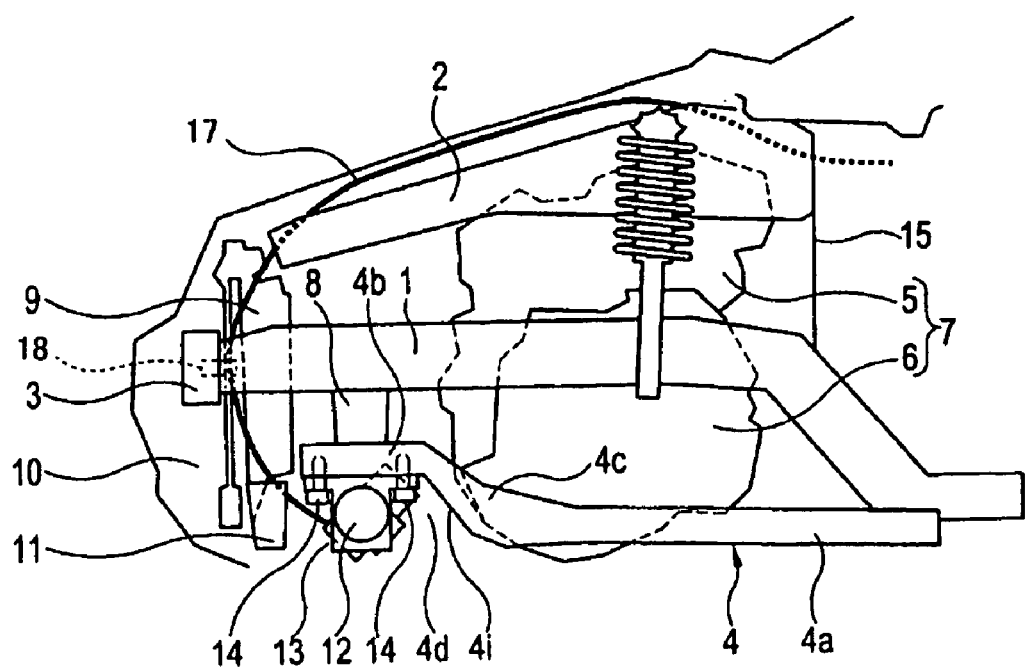
FIG. 33 is a side view of the present front structure of a vehicle body according to a thirteenth embodiment.

In the front structure of a vehicle according to a thirteenth embodiment, as shown in FIG. 33, the steering gear box 12 is connected to the steering wheel (not shown in the drawings)

via a cable 17, and rotating operation of the steering wheel is transmitted to the steering gear box 12 via the cable 17.

The cable 17 is supported by a cable supporting portion 18 provided on a front cross member 3, which is a component of the vehicle.

Therefore, a length equivalent to the distance at which the steering gear box 12 can move while avoiding other elements, such as power unit 7, is added to the cable 17 as an extra length.

Figure 34:
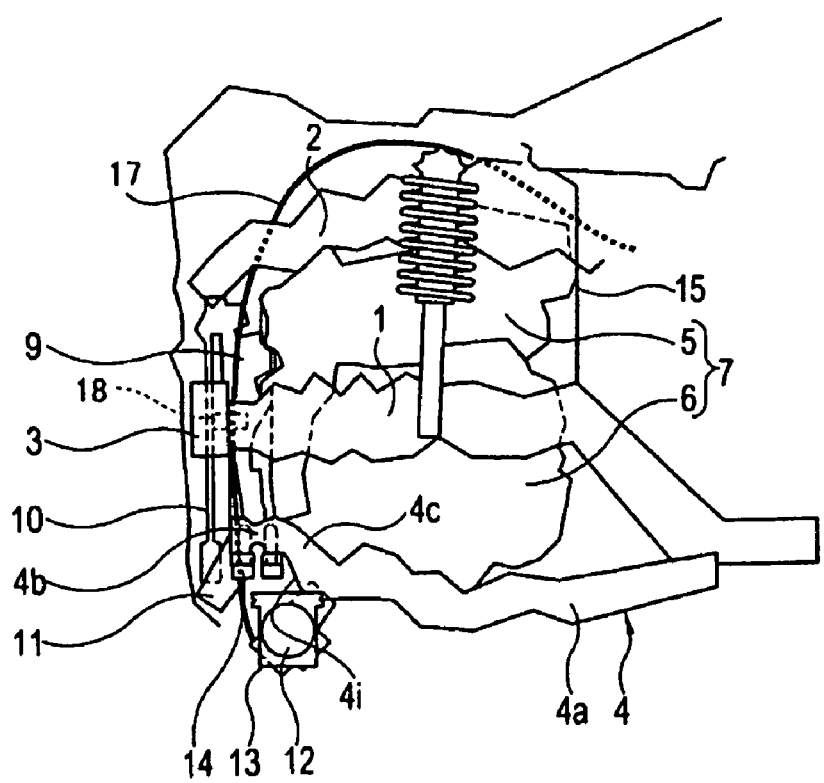
FIG. 34 is a side view illustrating operation of the thirteenth embodiment.

As shown in FIG. 34, the cable supporting portion 18 moves towards the rear side of the vehicle or the cable supporting portion itself breaks due to the rearward movement of the front cross member 3, etc., during a frontal collision of the vehicle.

By doing so, deflection is generated in the cable 17 thereby allowing movement due to the cable 17 being held up by the surrounding parts or the strain on the cable 17 when steering gear box 12 moves downwardly.

Therefore, the extra length of the cable permits movement of the steering gear box 12 beneath the power unit 7 during collision of the vehicle, thereby avoiding the interference between the power unit 7 and steering gear box 12. Consequently, the deformation space of the vehicle is significantly increased and the energy can be effectively absorbed.

Here, for comparison purposes, is the case in which no extra length is given to the cable.

Figure 35:
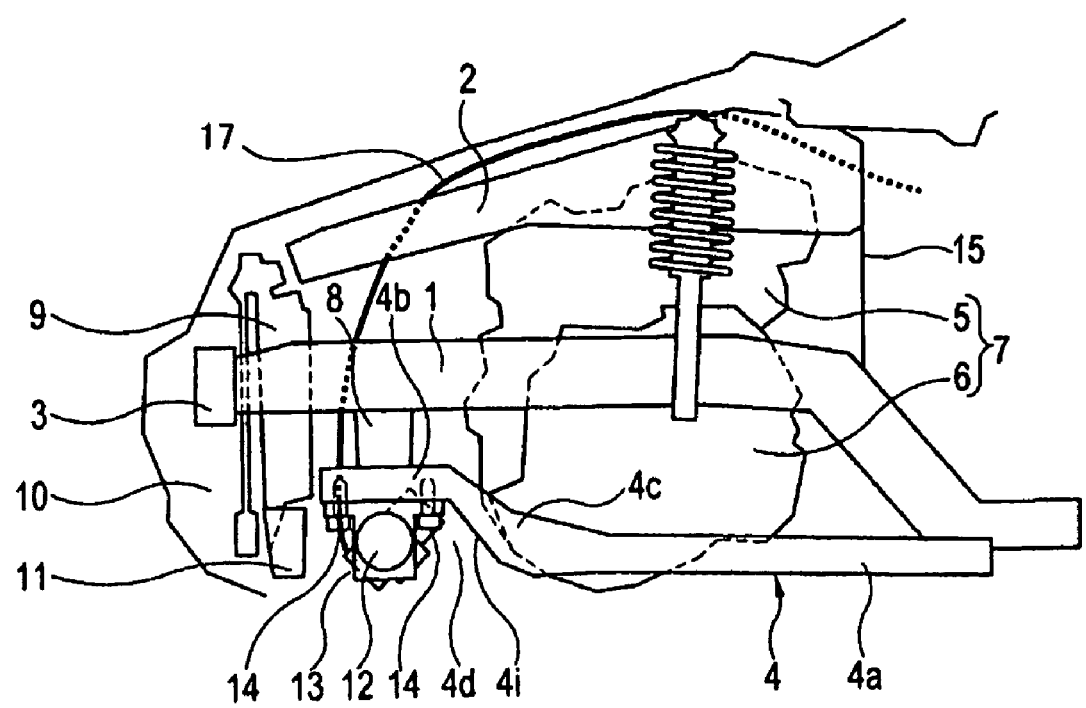
FIG. 35 is an explanatory view of a comparative example, wherein a cable does not have an extra length.

FIG. 35 shows a structure in which the steering gear box 12 and the steering wheel (not shown in the drawings) are connected with as short a length of cable as possible.

Figure 36:
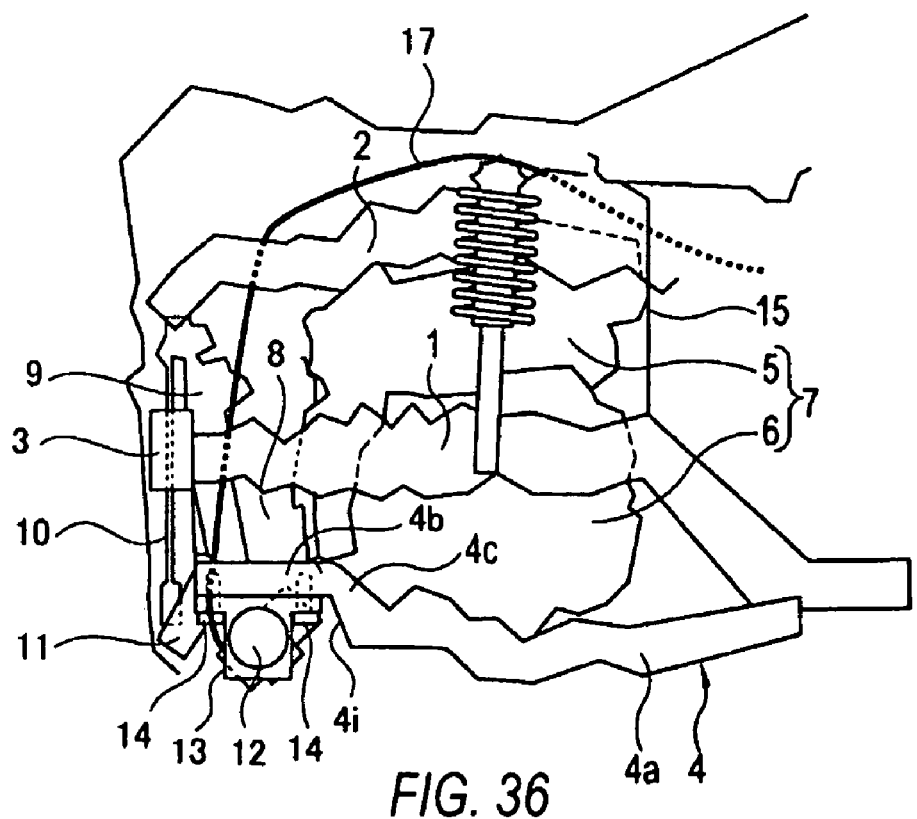
FIG. 36 is an explanatory view of a comparative example, wherein a cable has an extra length.

With such a structure, during a frontal collision, as shown in FIG. 36, the movement of the steering gear box 12 may be limited due to the cable 17 being held up by the surrounding elements, or the strain on the cable 17.

Therefore, the steering gear box 12 may, as shown in the figure, be located between the power unit 7 and other elements, and in such a case, the amount of deformation at the front end of the vehicle is decreased, and the shock absorbing effect may be reduced.

The descriptions of other structures and operations in the thirteen embodiments are omitted because they are the same as those in the first embodiment.

The actual structure is not limited to the embodiments illustrated and described, and design changes may be effected to the extent that they do not deviate from the intention of the present front structure.

For example, the fourth embodiment shows a case in which the suspension cross member 4b and the guide member 4e are formed of separate members; nonetheless the suspension cross member and the guide member may be provided by the same member.

In addition, the thirteenth embodiment shows a case in which a cable supporting portion 18 is provided on the front cross member 3; nonetheless, it may be provided on the front end frames 1, suspension member 4 or other structure of the auto body.

What is claimed is:

1. A front structure for a vehicle comprising:
a power unit mounted on a front end of the vehicle;
a steering gear box adjacent to the power unit and located in a first position in front of the power unit prior to a collision; and
a suspension member supporting the steering gear box, the steering gear box positioned adjacent a bottom surface of the suspension member, and the suspension member configured so that the steering gear box moves from the first position to a second position, wherein the steering gear box is located beneath the power unit, when the front end of the vehicle is selectively deformed due to the collision.

2. The front structure for a vehicle according to claim 1, the steering gear box attached to the bottom surface of the suspension member.

3. The front structure for a vehicle according to claim 2, wherein the suspension member includes a recessed portion located in front of the power unit, the steering gear box attached in the recessed portion.

4. The front structure for a vehicle according to claim 1, further comprising a block element positioned between the front end and the steering gear box to transmit deformation of the front end to the steering gear box in order to move the steering gear box from the first position to the second position.

5. The front structure for a vehicle according to claim 1, further comprising a guide formed on the suspension member and configured to selectively move the steering gear box downward and rearward from the first position to the second position during the collision of the vehicle.

6. The front structure for a vehicle according to claim 5, wherein the deformation of the suspension member forms the guide.

7. The front structure for a vehicle according to claim 5, further comprising a guide member attached along the suspension member.

8. The front structure for a vehicle according to claim 1, further comprising a guide member attached to the suspension member between the power unit and the steering gear box, the guide member configured to selectively move the steering gear box beneath the power unit during a collision of the vehicle.

9. The front structure for a vehicle according to claim 1, further comprising a guide member attached to the suspension member and positioned in front of the power unit, the guide member configured to selectively move the steering gear box beneath the power unit during a collision of the vehicle.

10. The front structure for a vehicle according to claim 1, further comprising a steering gear box mounting member receiving the steering gear box, the steering gear box mounting member attached to the suspension member so as to be separable during an application of a energy load from the front of the vehicle that exceeds a predetermined value.

11. The front structure for a vehicle according to claim 10, the steering gear box being mounted on top of the steering gear box mounting member.

12. The front structure for a vehicle according to claim 10, further comprising:
the suspension member including a sloped segment; and
the steering gear box mounting member having a sloped element, the sloped
segment and the sloped element being configured such that the steering gear box mounting member is fixed to the suspension member by engaging the sloped segment and the sloped element.

13. The front structure for a vehicle according to claim 1, further comprising a cable connecting the steering gear box to a vehicle steering wheel, the cable selectively transmitting rotational operation of the vehicle steering wheel to the steering gear box, the cable having a length greater than an installed distance between the steering wheel and the steering gear box, thereby allowing the steering gear box to selectively move beneath the power unit during a collision of the vehicle.

14. The front structure for a vehicle according to claim 13, further comprising:

a front end element attached to the front end of the vehicle; and a cable supporting element attached to the front end element, the cable supporting element positioning the cable during normal operation of the vehicle and allowing the cable to freely reposition during a collision of the vehicle.

15. The front structure for a vehicle according to claim 14, wherein the front end element is a front cross member.

16. The front structure for a vehicle according to claim 14, wherein the front end element is a front end frame.

17. The front structure for a vehicle according to claim 14, wherein the front end element is the suspension member.

18. A front structure for a vehicle comprising:

a power unit selectively mounted adjacent a front end of the vehicle;

a steering gear box adjacent to the power unit and located in a first position in front of the power unit prior to a collision;

a suspension member supporting the steering gear box, the steering gear box positioned adjacent a bottom surface of the suspension member; and a guide formed on the suspension member between the power unit and the steering gear box, the guide configured to selectively move the steering gear box from the first position to a second position, wherein the steering gear box is located beneath the power unit, during the collision of the vehicle.

19. The front structure for a vehicle according to claim 18, wherein the suspension member includes a recessed portion located in front of the power unit, the steering gear box attached in the recessed portion.

20. The front structure for a vehicle according to claim 19, further comprising a block element positioned between the front end and the steering gear box to transmit deformation of the front end to the steering gear box in order to move the steering gear box from the first position to the second position.

* * * * *